ID
3,275,494
EMBOSSED ARTICLE FOR 3-DIMENSIONAL PRINTING COMPRISING A HOT MELT COATING
Marion O. Brunson and James E. Huffaker, Kingsport, Tenn., assignors to Eastman Kodak Company, Rochester, N.Y., a corporation of New Jersey
No Drawing. Filed May 21, 1962, Ser. No. 197,173
7 Claims. (Cl. 161—33)

This invention concerns a composition of hot melt plastic materials, more particularly coatings which may be embossed with a lenticular pattern for 3-dimensional pictures.

Hot melt applications of various plastic materials have been found suitable for a wide number of applications. The plastic material is applied in the molten state to various substrates, such as paper or the like, without requiring solvent recovery systems which are necessary for commonly used lacquer coatings.

Many of the hot melt coatings have been waxes or blends of waxes with other plastic materials. For instance, polyethylene has been combined with paraffin to provide a hot melt coating and cellulose esters have been applied satisfactorily using the hot melt method.

In order to provide a satisfactory coating for paper, particularly paper webs carrying colored pictures or the like on the surface, it is desirable to have a coating which will have good resistance to abrasion, withstand folding, have good adhesion, and be resistant to solvents, stains, grease, and the like. However, the prior art compositions, while satisfactory in many respects, have not been found suitable in all the above desirable effects, particularly when a lenticular pattern, such as that shown in U.S. Patent No. 2,297,846, has been embossed on the hot melt coating. Moreover, many of the prior art coatings have not had satisfactory flexibility and toughness.

In view of the fine curvature of the lenticular pattern, very slight abrasions of a relatively soft coating can result in destroying the effect of the pattern and render it unsuitable. For this reason, it has been desirable to find a plastic coating which would be able to hold the embossed pattern and at the same time have the above-desirable characteristics.

We have discovered a blend of polyethylene with a copolymer of ethylene and ethyl acrylate which has remarkably good coating characteristics when applied by the hot melt process and which can be embossed with a lenticular pattern to provide a satisfactory 3-dimensional effect.

One object of this invention is to provide a polyolefin-ethylene-ethyl acrylate copolymer blend for hot melt application. Another object is to provide a coating having superior flexibility which will withstand folding, has good adhesion to paper and printing inks, has good resistance to blocking and has good abrasion resistance. Another object is to provide an embossed hot melt coating which gives a 3-dimensional effect and which retains the embossed pattern. Still another object is to provide new products comprised of a colored picture, printing and the like in combination with our new coating. Other objects will appear hereinafter.

The above objects are attained by combining polyethylene having the following properties:

Molecular weight _____ 4,000 to 12,000
Density _____ 0.90 to 0.972
Melt viscosity at 150° C. _____ c.p.s.__less than 20,000 with an ethylene-ethyl acrylate copolymer having the following properties:

Melt index _____ 15–100
Percent elongation at break _____ 750–800
Density at 30° C. _____ 0.915 to 0.95
Inherent viscosity cp. at 30° C. _____ 0.85 to 0.90
Refractive index _____ 1.481 to 1.484

Copolymers of ethylene and ethyl acrylate wherein the ethyl acrylate concentration is between 5 and 30% may be used.

The preferred composition is as follows:

Materials:                                    Weight, percent
Copolymer of ethylene and ethyl acrylate ____ 20 to 90
Polyethylene _____ 40 to 80
Paraffin _____ 0 to 60
Polyterpene resin _____ 0 to 10

Certain other components may be added such as slip agents including oleyl amide or acetylated monoglycerides marketed as "Myvacet" by Distillation Products Industries, Rochester, New York. The amides of C–10 through C–30 saturated and unsaturated mono- and polycarboxylic acids may be substituted for oleyl amide. Other amides which may be used are described in U.S. Patent No. 2,770,609.

Hydrocarbon resins (polyterpenes) may be used having a softening point of 40–150° C., specific gravity of 25/25° C. of .970–.980, and acid number of less than 1, and a molecular weight of 300–2,000. These resins are primarily composed of β-pinene.

A small amount of paraffin may be added, provided the polyethylene and the ethylene-ethyl acrylate copolymer are included.

The ethylene-ethylacrylate copolymer preferred in this invention has a melt index of 18, a density of 0.929 and an ethylacrylate content of approximately 15 percent. A typical material may be purchased under the trade name of Zetafin 70, marketed by the Dow Chemical Company. However, the useful ethylene-ethylacrylate copolymers include materials prepared by the copolymerization of ethylene and ethylacrylate at pressures of approximately 15,000 p.s.i. and temperatures between 150 and 250° C. in the presence of a suitable catalyst.

The following examples are intended to illustrate our invention but not to limit it in any way:

*Example 1*

| Material | A | B | C |
|---|---|---|---|
| Ethyl acrylate-ethylene copolymer | 30 | 20 | 20 |
| Polyethylene | 70 | 60 | 70 |
| Polyterpene Resin (Piccolyte S-100) | | 10 | 8 |
| 140° Average Melting Point Paraffin | | 19.5 | |
| Oleamide | | 0.5 | 2 |

*Example 2*

A coating composition having a blend of 80% low molecular weight polyethylene (7,000) and 20% by weight of a copolymer of ethylene and ethyl acrylate having a melt index of 18 is prepared. This blend is heated to a molten state and coated on a paper surface to a thickness of 10 mils and permitted to cool. It is tested for physical characteristics and found to be flexible enough to withstand folding, have good adhesion, good resistance to blocking, resistance to abrasion, colorless, and with good heat stability.

This print is also embossed with a lenticulated pattern upon a specially prepared printed picture and the resulting coated picture has a good 3-dimensional effect. The uncoated picture is prepared by taking a photograph using a camera especially designed for movement around the subject matter. The photograph is then used to make printing plates, from which printed reproductions are made. The printed picture when coated and embossed with the above plastic blend has good 3-dimensional effect. The coating and embossing may be in accordance with the process and apparatus of our copending application Serial No. 75,400, filed December 12, 1960, now U.S. Patent No. 3,110,608 granted on November 12, 1963.

*Example 3*

A sample of ethylene-ethyl acrylate copolymer having a melt index of 18.5 and an ethyl acrylate concentration of 15% was evaluated on the Harris-Seybold coating machine. It was observed that this coating could be applied on the machine and the resulting coating gave good adhesion, clarity, tensile strength, and fair scuff resistance. Previous to this determination, it was felt that a material as high in molecular weight as this product could not be successfully handled on this coating machine. The calculated viscosity of this product is 460,000 cps. at 190° C.

*Example 4*

A composition composed as follows:

| Materials: | Percent by weight |
|---|---|
| Polyethylene (molecular weight 3,000) | 47.5 |
| Ethylene-ethyl acrylate copolymer (18 melt index) | 47.25 |
| Polyterpene resin (molecular weight 1,000) | 5 |
| Oleamide | 0.25 |

This composition was prepared and evaluated on the Harris-Seybold machine. This composition was evaluated for both three-dimensional printing and for general purpose decorative coatings. This composition exhibited extremely good adhesion, toughness, flexibility, scuff resistance and clarity.

Although the hot melt compositions described herein are particularly adaptable for coating 3-dimensional printing, they may also find application in the general paper coating field. In other applications this coating may serve as a moisture vapor barrier, provide a heat-sealable coating and a general decorative effect.

The invention has been described in detail with particular reference to preferred embodiments thereof, but it will be understood that variations and modifications can be effected within the spirit and scope of the invention as described hereinabove and as defined in the appended claims.

We claim:
1. An embossed flexible sheet having a 3-dimensional appearance comprising a fibrous substrate which carries printing thereon upon which is securely adhered a flexible, tough, transparent, abrasion-resistant layer of a coating composition comprising a blend of 20–60% by weight of a copolymer of ethylene and ethyl acrylate having a melt index of 15 to 100 and containing an ethyl acrylate concentration of between 5 and 30%, and 40–80% polyethylene having a molecular weight of 4,000 to 12,000 and a density of 0.90 to 0.972 and having on the surface of the sheet an embossed lenticulated pattern.

2. The sheet of claim 1 wherein the coating composition has a thickness of the order of 10 mils.

3. The sheet of claim 1 wherein the coating composition is composed of about 30% of a copolymer of ethylene and ethyl acrylate and about 70% of polyethylene.

4. The sheet of claim 1 wherein the coating composition contains up to 10% of a polyterpene resin.

5. The sheet of claim 4 wherein the coating composition is composed of about 20% of a copolymer of ethylene and ethyl acrylate, about 60% of polyethylene, about 10% of a polyterpene resin, and about 19.5% of paraffin.

6. The sheet of claim 4 wherein the coating composition is composed of about 20% of a copolymer of ethylene and ethyl acrylate, about 70% of polyethylene, about 8% of a polyterpene resin and about 2% of an oleamide.

7. The sheet of claim 1 wherein the coating composition is composed of about 20% of a copolymer of ethylene and ethyl acrylate having a melt index of about 18 and about 80% of polyethylene.

References Cited by the Examiner

UNITED STATES PATENTS

| 2,190,843 | 2/1940 | Miller | 117—15 |
| 2,453,644 | 11/1948 | Steinkraus | 260—28.5 |
| 2,523,705 | 9/1950 | Lovell et al. | 260—28.5 |
| 2,579,044 | 12/1951 | Kober | 117—155 |
| 2,652,326 | 9/1953 | Ogle | 96—26 |
| 2,770,609 | 11/1956 | Symonds | 117—128.4 |
| 2,868,762 | 1/1959 | Oakes | 260—45.5 |
| 2,912,398 | 11/1959 | Johnson et al. | 260—897 |
| 2,914,407 | 11/1959 | Meyer | 96—45 |
| 2,953,541 | 9/1960 | Pecha et al. | 260—45.5 |
| 2,984,342 | 5/1961 | Smith | 117—155 |
| 3,001,964 | 9/1961 | Miller | 260—28.5 |
| 3,025,257 | 3/1962 | Coler et al. | 260—23.6 |
| 3,029,154 | 4/1962 | Kapral et al. | 117—15 |
| 3,035,933 | 5/1962 | Warner | 117—15 |
| 3,125,548 | 3/1964 | Anderson | 117—155 |

NORMAN G. TORCHIN, *Primary Examiner.*

A. D. RICCI, C. BOWERS, *Assistant Examiners.*